United States Patent [19]
Einstein

[11] Patent Number: 5,845,189
[45] Date of Patent: Dec. 1, 1998

[54] PROCESS FOR STABILIZING A MICROCHANNEL PLATE

[75] Inventor: Bernard Caesar Einstein, Redwood City, Calif.

[73] Assignee: Litton Systems, Inc., Woodland Hills, Calif.

[21] Appl. No.: 426,808

[22] Filed: Dec. 20, 1973

[51] Int. Cl.⁶ .............................. B22F 1/00; H01J 43/20
[52] U.S. Cl. ..................... 419/58; 204/158.2; 313/534
[58] Field of Search ........................ 117/106 R, 106 A; 204/158.2; 313/534; 419/58

[56] References Cited

U.S. PATENT DOCUMENTS 3,635,683  1/1972  Harrison et al. .................... 427/255 X

*Primary Examiner*—Peter A. Nelson

[57] ABSTRACT

The secondary emission characteristics of a microchannel plate of the type fabricated of lead oxide glass and activated by a hydrogen gas bake is stabilized by treating with another gas, such as hydrogen sulfide, at an elevated temperature.

14 Claims, 1 Drawing Sheet

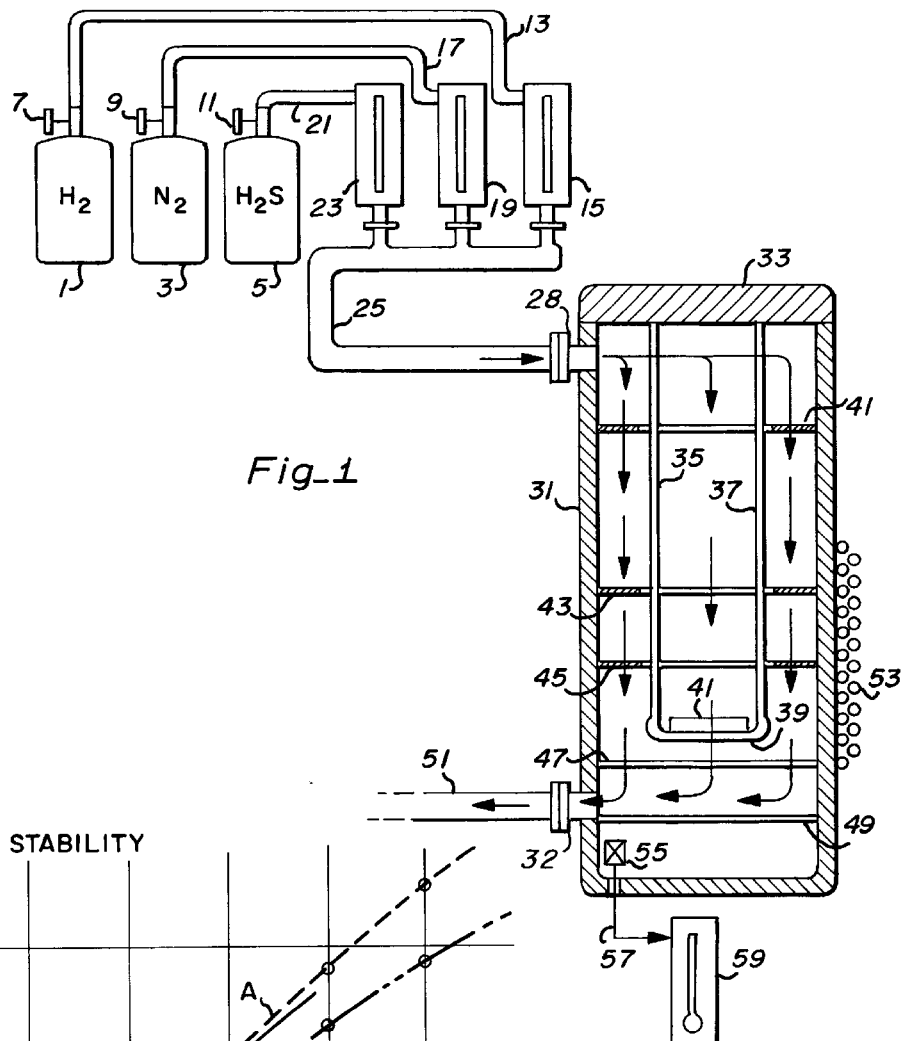
Fig_1
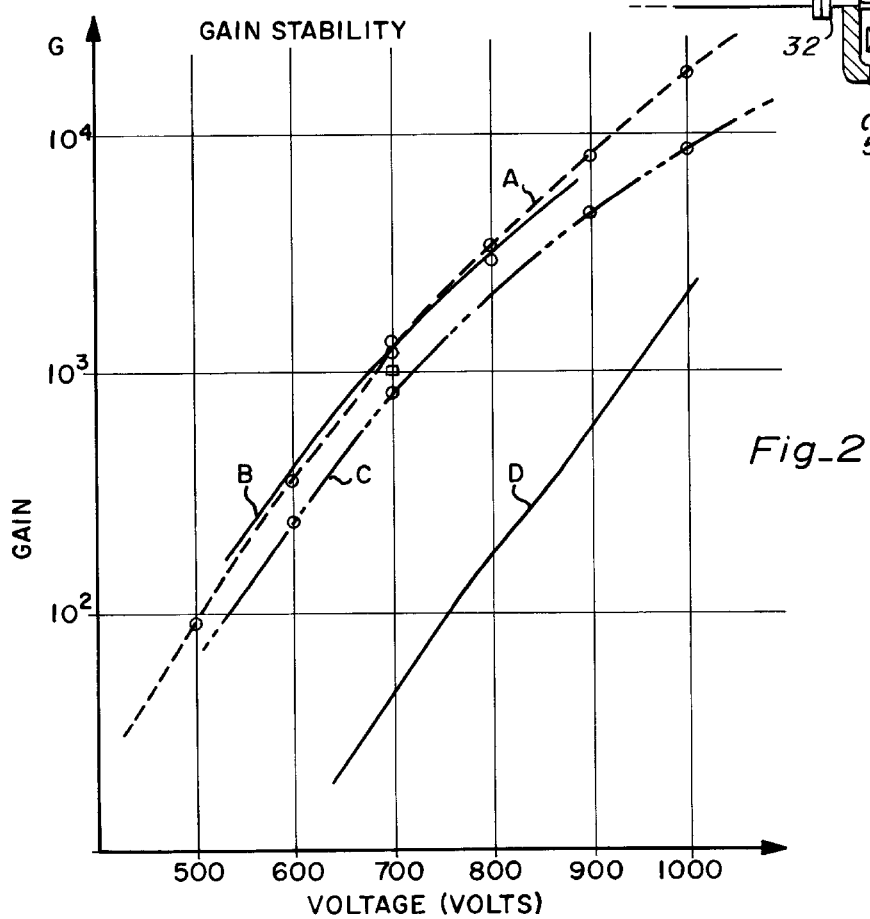
Fig_2

PROCESS FOR STABILIZING A MICROCHANNEL PLATE

FIELD OF THE INVENTION

This invention relates to microchannel plates and, more particularly, to a process for stabilizing the characteristics of a microchannel plate.

BACKGROUND OF THE INVENTION

Devices which amplify light, commonly termed "low light level sensing devices", are old and known. These devices find application in military or security installations, for example, applications in which one desires to obtain a visible image of a scene that is in substantially complete darkness, such as a scene illuminated only by starlight. One type of low light level sensing device includes as a component an element which is termed a "microcapillary multiplier matrix", or microchannel electron multiplier plate, and also known as simply a "microchannel plate". This element is in the form of a wafer or plate of glass which contains a very large number of minute passages arranged parallel that extend through to the front and back surfaces. For example, there is on the order of 1,000,000 such passages in a one-inch diameter wafer. The passages in the microchannel plate are lined with or contain a material having a high enough coefficient of secondary emission to be used as a continuous strip electron multiplying device so that for each electron entering the front of a passage a larger number of electrons is emitted through the other end.

In a given low light level sensing device the microchannel plate is arranged between a photocathode and a phosphor display screen in an evacuated envelope or housing and conventional bias voltages are applied to the elements. Then when an image is cast upon the photocathode, electrons are emitted by the photocathode in the mosaic of the image and these electrons are directed through suitable accelerating voltages to the microchannel plate. The mosaic electrons accordingly enter the passages in the plate and a larger number of electrons exit from the rear of the microchannel plate in the same mosaic and thence are accelerated by a suitable electric field onto the phosphor display screen. As a result, the brightness of the scene as it appears on the phosphor display screen is greater than the original scene presented to the photocathode.

A persistent problem with present microchannel plates is that its gain, i.e., the electron multiplying factor, or coefficient of secondary emission, changes with time; sometimes this change occurs over a very short period of time. And some means to stabilize the gain of the microchannel plate is necessary. Heretofore one means I used to stabilize the gain of the microchannel plate is to put a large electrical current through the microchannel plate, suitably a current on the order of microamps per square centimeter. The effect of this is to create outgassing in the form of ion emission from the walls of the multipliers. In so doing, the gain may stabilize, but unfortunately it may stabilize at a low output level, such as renders the component marginally usable. Although outgassing of the tube also tends to stabilize the microchannel plate, the release of gas molecules in a completed tube creates an undesirable situation in the low light level sensing tube in that these molecules ionize and under accelerating voltages can impinge upon the photocathode resulting in its destruction. This problem is increased if increased gain is desired by increasing the photocathode to microchannel plate voltage since the gain of the microchannel plate is mathematically a power function of the applied accelerating voltage. With larger accelerating voltages any ionized gas molecules are accelerated through a greater potential and release a greater and more destructive kinetic energy when they impinge upon the photocathode. Thus ideally a high gain is desired but with as low an accelerating voltage as is possible between the photocathode and microchannel plate to minimize such ion bombardment.

The changing gain characteristics and, hence, the desire of gain stabilization can best be understood by considering, briefly, the complex structure of known microchannel plates as produced by known techniques. In one technique cored glass fibers are produced taking first a boule of etchable glass and a boule of nonetchable glass, such as Corning 8161 glass, having a high lead oxide content and various impurities such as barium. By conventional technique a glass fiber is drawn from these boules in which the etchable glass forms the core and the nonetchable glass forms the cladding of the core. A large number of these cored glass fibers are then fused together into a bundle and the bundle is then sliced to form glass wafers having the large number of glass fibers extending between the front and back sides thereof. The wafer is then placed in an etchant acid solution, such as hydrochloric acid, which etches out the core of each of the fibers leaving a large number of minute passages. The wafer or plate is then cleaned in a suitable manner and the internal walls of the passages are "activated" to give those surfaces an appropriate conductivity and secondary emission characteristic. In one typical activation process the plate is placed in a hydrogen atmosphere and fired at a temperature of 375° Centigrade for a period of approximately 12 hours. There is differing opinion among those skilled in the art as to what exactly does occur but what results are passage walls that have a high coefficient of secondary emission.

According to one theory, the hydrogen activation causes a reaction of the lead silicate glass. The lead oxide in the glass separates out as a new "phase" of the glass. This phase contains more than one oxide of lead, such as PbO and $PbO_2$, and such oxides appear as closely spaced islands or clumps. The separation of this phase in addition creates free lead, Pb. This free lead is "forced out" of the matrix so to speak, and forms thin discontinuous coverings or "patchy" surface coverings on the glass.

The lead oxide and suboxide "islands" contain free electrons which can move from island to island under the influence of an electric field. This it is believed establishes the necessary electrical conductivity through the passages between the front and back sides of the wafer. The secondary emission of electrons appears to be determined by the properties of the glass silicate matrix, which is essentially believed to be the same for all glasses independent of the configuration of the impurities in the glass. Of course, if more electrons exit the passage than enter, a deficit of electrons would exist. The electrically conductive path described is the mechanism supplying the silicate matrix with electrons from a source, such as a power supply, to replenish those lost through secondary emissions.

It is speculated that the loss of gain during extended usage of the electron multiplier may be due to the movement or drift of the free lead from the output electron end of the passage to the input end of the passage. Should such occur, I believe that this causes the secondary emission coefficient of the input end of the passage to decrease and causes a loss of signal to noise ratio of the electron avalanche; and, secondly, the presence of lead may change the voltage gradient at the input end to cause an effective decrease in channel or passage length.

The composition of the passages is therefore, in my opinion, an unstable heterogeneous mixture of lead, lead oxide, and absorbed gases having characteristics that may be changed by electron or ion bombardment. If the excess lead becomes oxidized during usage of the microchannel plate, the secondary emission coefficient and conductivity of the channels again changes. This is obviously not desirable.

OBJECTS OF THE INVENTION

Accordingly it is an object of my invention to provide a process for stabilizing the secondary emission characteristics of a microchannel plate.

It is an additional object of my invention to provide a microchannel plate which provides a high gain that remains relatively stable with time.

BRIEF SUMMARY OF THE INVENTION

Briefly, in accordance with my invention, a microchannel plate is exposed to a combination atmosphere of hydrogen-sulfide with hydrogen or another carrier gas at an elevated temperature.

The foregoing and other aspects and advantages of my invention as well as modifications and equivalents thereto are better understood from consideration of the detailed description of the invention which follows, taken together with the figures of the drawings.

DESCRIPTION OF DRAWINGS

In the drawings:

FIG. 1 illustrates schematically the apparatus for performing the process of my invention; and FIG. 2 is a graph showing the gain and stability of a microchannel plate processed in accordance with my invention.

The equipment and supplies useful to the practice of my novel process is schematically illustrated in FIG. 1. This includes a conventional canister 1 of hydrogen gas ($H_2$) under pressure, a canister 3 of nitrogen gas ($N_2$) under pressure, and a canister 5 of hydrogen sulfide gas ($H_2S$) under pressure. These gases are of high grade commercial quality and contain no more than 10 parts per million of any impurity such as water vapor or CO or $CO_2$, and are commercially available. Each of the gas canisters 1, 3 and 5 includes a regulator valve 7, 9 and 11, respectively. The output of canister 1 is connected by suitable piping 13 to the inlet of flowmeter 15. Likewise the output of the canister 3 is connected by piping 17 to a flowmeter 19 and the output of canister 5 is connected by pipe 21 to a third flowmeter 23. The outlets of the respective flowmeters 15, 19 and 23 are connected in common to pipe 25 and pipe 25 is in turn connected to the inlet 28 of a chamber 31, which I refer to as an oven, shown schematically and in section to better illustrate its elements. The oven includes a cylindrical chamber 31, suitably of Pyrex or quartz and capable of withstanding the high temperatures hereinafter described; a gas outlet 32, located at the lower end of the chamber; and a cover 33. Fastening means, not illustrated, hold the cover in place. Support rods 35 and 37 are attached at one end to the underside of cover 33 and at their other end support a tray 39 in a lower portion of the chamber. A microchannel plate 41 is illustrated seated on tray 39 within the oven for processing. A series of heat baffle plates 41, 43, 45, 47 and 49 are installed in the chamber and evenly distributed above and below the tray 39 so as to maintain some symmetry of heat at the tray location. A pipe 51 connected to outlet 32 is included to permit exhaust gases and waste products to be transmitted to any suitable disposal, not illustrated, such as a burner. An electric heater 53, symbolically indicated as a section of a resistance wire coil, is located external of the metal chamber and in abutting relationship with the chamber walls for conducting heat thereto. The heating coil is connected to a suitable source of electric current, not illustrated. A thermocouple 55, symbolically illustrated, which monitors oven temperature, is installed within the chamber by suitable supports, not illustrated. The thermocouple is connected via an electric lead 57 to suitable translating and indicating apparatus 59, symbolically illustrated as a temperature indicator.

In operation the microchannel plate is installed on the tray 39 and cover 33 is lowered into position onto the cylindrical oven 31. The cover is fastened in place to close the heating chamber leaving the microchannel plate positioned within the oven chamber. The valve 9 on the nitrogen container 3 is opened to allow gas to flow into inlet 29, through the oven and out the outlet. Electrical current is supplied to the electric heater and the heat generated in the resistance wire 53 is conducted to the chamber walls and hence to within the chamber raising the atmosphere in the chamber temperature to within the range of 350°–450° C. as hereinafter discussed. The nitrogen gas is a neutral substance which is used essentially to purge air from the oven chamber and although not absolutely necessary to the practice of the invention, it is preferred. After the nitrogen has been flowing for a period of approximately 10 minutes the valve is closed to stop the flow of nitrogen. Next, valve 7 of hydrogen canister 1 is opened and hydrogen flows through pipe 13, flowmeter 15, pipe 25 and into chamber 31. The flow rate is adjusted to that desired and monitored on flowmeter 15. In one example the flow rate is 0.1 cubic feet per minute. The hydrogen is heated as it flows through the chamber to a temperature of approximately 415° Centigrade, in one example, and approximately at atmospheric pressure. The hydrogen is incident upon the microchannel plate and enters the passages therein. The hydrogen chemically reacts with the lead oxide in the passage walls in a manner more fully discussed hereinafter. This reaction creates water vapor, $H_2O$, as a waste gas and reduces some of the lead oxide (PbO) in the microchannel plate to free lead (Pb). The hydrogen and such water vapor as is generated in the reaction is exhausted through outlet 51 to the sink. At the temperature and flow rate specified in the example the hydrogen is allowed to flow for approximately 12 hours. Valve 11 of hydrogen sulfide gas canister 5 is then opened and adjusted to the desired flow rate, which in the example is approximately 0.05 cubic feet per minute, and this is indicated on flowmeter 23. The hydrogen sulfide gas flows through pipe 21, flowmeter 23, mixes with the hydrogen gas in pipe 25, and both gases enter oven inlet 29. Both gases are heated as they flow from the upper end of the chamber through the oven and in this example are raised in temperature to approximately 415° Centigrade as indicated by thermocouple 55 and indicated on indicator 59 at approximately atmospheric pressure. The hydrogen sulfide enters the passages in the microchannel plate and reacts chemically with the exposed chemical elements lining the passages. As is more fully explained hereinafter, I believe the $H_2S$ reacts with the lead, Pb, created as a result of the previous reduction reaction with hydrogen to create another substance, lead sulfide, PbS, while the hydrogen gas acts, I believe, simply as a carrier at this stage. The mix of gases, including hydrogen and hydrogen sulfide, continue through the oven and exit at outlet 51 to the sink. The lead sulfide created in the process is volatile, relatively, and vaporizes and likewise exits as a gas out outlet 51 to the waste disposal system, where the gases are conveniently burned off. At the flow rates and temperature given in the preceding example and in this step of the process the hydrogen sulfide and hydrogen flows for a period of approximately 12 hours.

At the conclusion of this process valves 7 and 11 are closed and the electric heater is turned off. If desired, the valve 9 of nitrogen container 3 may be opened to allow nitrogen gas to purge any residual gases in the chamber at this time.

After the oven has cooled sufficiently, the cover 33 is lifted and the microchannel plate 41 is removed from the tray for further processing and fabrication and assembly into a complete image intensifier sensing device. Such processing may include the conventional assembly of electrodes on the front and back faces on the microchannel plate and the installation of a thin film of the type taught in my earlier patent, U.S. Pat. No. 3,720,535 and 3,742,224. In addition, the microchannel plate is installed in any conventional manner into the low light level sensing tube apparatus in a manner known to those skilled in the art and exemplified by U.S. Pat. No. 3,742,224. And the microchannel plate is "scrubbed" prior to sealing the tube. In the conventional technique, known as "scrubbing", the microchannel plate is mounted between an electron source and an electron collector and suitable accelerating voltages are applied between the source, front and back ends of the microchannel plate and the collector and an ammeter is connected in circuit with the collector to measure current. In this, electrons from the source are directed into the microchannel plate passages and create additional secondary electrons which are accelerated out the back side of the microchannel plate to the electron collector and a current flows from the collector, the ammeter and electrical circuitry back to the source of voltage. The voltages are adjusted so that a heavy output current is measured at the collector, suitably on the order of one microamp per 18 millimeter diameter plate area, which is between 10 to 100 times larger than the normal "in use" microchannel plate output current. This heavy current is continued for a period by way of example of approximately 18 hours.

The ratio of gas flow rates of hydrogen sulfide gas to hydrogen gas in the gas atmosphere of the foregoing example is in the ratio of 1 to 2 by volume at the same pressure and temperature. As is apparent, this ratio may be changed or an optimum ratio may be experimentally determined to obtain the best results or change the rates of reaction.

I believe that what occurs in the prior art activation process is that the hydrogen gas, a reducing agent, reacts with the lead oxide in the silica (glass) matrix. Initially it reduces some of the lead oxide in the silica matrix (glass) near the surface of the walls of the microchannel plate passages to lead suboxide, lead oxide, lead and water leaving a patchy surface coating of lead and a subsurface coating of lead oxide. The lead oxide matrix forms the conduction current feed for electrons lost from the silica matrix during the secondary emission process. This conversion of lead oxide to lead is evidenced physically. The fact that the microchannel plate turns black in color is evidence of the formation of lead oxide and lead suboxide.

An additional physical factor evidencing the change is a loss of weight on the order of 1 to 2 percent of the weight of the microchannel plate, which leads to the deduction that the oxygen in the lead oxide is removed in the activation reaction reducing the weight during baking.

The major reaction products of the hydrogen on the microchannel plate is lead and water, $H_2O$. The prior art treatment of the glass with heated hydrogen gas as a reducing agent to "activate" the plate so that the passage walls in the plate provide high secondary electron emission (electron multiplication) may not be fully understood, particularly the character and exact composition of the microchannel plate and the mechanics of the reaction which occurs, but such is not necessary to an understanding of my process invention.

In the aforementioned hydrogen activation step of the prior art, the exposure to a heated stream of hydrogen gas which I generically refer to as "baking" in a hydrogen atmosphere, my experiments have shown that with higher temperatures the activation reaction occurs in a shorter period of time and results in a larger volume of reaction product; with lower temperatures the reaction takes longer to occur; and at the temperature of 415° Centigrade nominal the reaction takes about 12 hours to be fully effective. Completion of the reaction is experimentally determined at the point at which "weight loss saturation" occurs: That is, with additional reduction in hydrogen or "baking" in hydrogen at a given temperature the microchannel plate has no significant measurable additional weight loss. Thus after 12 hours of "baking" in hydrogen at the temperature of 415° Centigrade, no further weight loss is recorded and it is assumed that as much of the lead oxide in the microchannel plate passages as can be reduced to lead has been reduced to lead.

In the novel step of my process the introduction of hydrogen sulfide gas mixed into the hydrogen gas and bearing the proportion of 1 to 2 by volume at the same temperature of 415° Centigrade for a like period of 12 hours results in a noticeable, although slight, additional loss of weight on the order of 0.5 percent of the weight of the microchannel plate. Obviously a sensitive balance is required to verify this weight loss but it is indicative that another chemical reaction has occurred, since as verified by the preceding step no further weight loss could be measured by baking the microchannel plate simply in a hydrogen atmosphere. Thus hydrogen sulfide gas reacts with the molecules of the microchannel plate.

What I believe occurs in the reaction is that the hydrogen sulfide reacts with the lead to form lead sulfide and with the PbO to PbOS. The latter reaction is to less than 1 percent and insignificant. This alone would appear to result in a heavier microchannel plate rather than a lighter microchannel plate. However lead sulfide is more volatile than lead oxide and I conclude that the lead sulfide partially vaporizes at the elevated temperatures involved, as evidenced by the color of the escaping gases, and the lead sulfide gas is carried off in the exhaust gases. In effect, some amount of lead is removed from the microchannel plate passage walls. As before, experience has shown that this chemical reaction continues only until a point is reached, that I term "weight loss saturation", where any additional baking in hydrogen sulfide gas does not result in any additional weight loss in the microchannel plate. In the preceding example the gases were heated to 415° Centigrade nominally and the microchannel plate was baked for a period of 12 hours, determined to be the point at which such weight loss saturation occurs.

In the specific example given, a microchannel plate weighing 0.5372 grams was reacted in the hydrogen gas atmosphere in accordance with the foregoing teachings after which the weight was again measured and a weight of 0.5277 grams was found. This is a loss of 0.0095 grams. The microchannel plate was then put through the second step of the process and upon completion the microchannel plate weight was again measured and a weight of 0.5273 grams was recorded. This was a weight loss of 0.0004 grams. As before, raising the temperature undoubtedly decreases the time at which saturation is to be reached. As a practical matter the temperature is limited by the softening point of the microchannel plate glass at about 430° C. and is limited at the lower temperature to about 350° C. which is considered a practical temperature range. Likewise, decreasing the temperature will slow down the reaction and consequently a greater period of time would be required to reach such reaction saturation.

In the foregoing description it is apparent that I have taken two distinct steps in carrying out the activation and stabilization processing of the microchannel plate: namely first baking in only the reducing atmosphere, hydrogen gas, which activates the microchannel plate and thereafter the baking of the microchannel plate in the combination of hydrogen and hydrogen sulfide gases. I prefer this since it allows inquiry into the manner of the reaction, allows the individual effects of both activation and stabilization to occur and renders the process more predictable.

As is evident however the microchannel plate may be processed or baked simply in a mixed atmosphere of hydrogen gases and hydrogen sulfide gases eliminating the step of baking in hydrogen gas alone, so that both reactions may occur simultaneously rather than sequentially. The hydrogen reaction may be carried out at one temperature and the $H_2S$ reaction may be carried out in an inert noble gas or pure $H_2S$ at a more elevated temperature. Obviously some adjustments are required in the specification of temperatures and mixtures as well as the time for the reactions to reach saturation, but such is fully within the scope of my invention.

And although hydrogen sulfide gas was chosen as the manner of introducing sulfur, I may also employ elements similar to sulfur, such as tellurium or selenium which have similar chemical properties. However these require higher bake temperatures to achieve the same results and therefore are limited in application to the above listed microchannel plate glass softening point. Thus I may use hydrogen telluride or hydrogen selenide in the process so as to form lead telluride or lead selenide which are of lower volatility than lead oxide but of lesser volatility than lead sulfide, hence with these two equivalents higher processing temperatures are needed to bake off the lead selenide or lead telluride molecules. In general I may use any reactive gas which when brought in contact with lead removes it to make a lead free gas surface in the multiplier passage.

The hydrogen gas of the hydrogen/hydrogen-sulfide gas mixture is viewed simply as a convenient carrier to carry away the vaporized products of hydrogen sulfide since it has proven compatible with the process and because the equipment for disposing of the waste gases is the same as that used for disposing of the hydrogen gas used in the previous activation step. As previously noted, the disposal equipment simply burns off the gases in a flame so that the hydrogen forms water vapor. I believe that other carrier gases, including inert gases, can be employed as the carrier instead of hydrogen to be mixed with the hydrogen sulfide gas providing suitable disposal equipment is available. Nitrogen and sulfur dioxide are examples.

Moreover, inasmuch as I believe that the effect of the hydrogen sulfide gas is to combine with free lead and essentially remove such free lead from the passages of the microchannel plate, it is the sulfide ion of the hydrogen sulfide gas which is most important to the aforedescribed reactions. Thus it is equally possible, although more difficult, to vaporize pure sulfur and allow this gas to similarly react with the free lead to form volatile lead sulfide, although this variation, being obviously less convenient, is not preferred.

Broadly speaking therefore, I treat the microchannel plate with a gaseous substance at an elevated temperature. The gaseous substance selected is any substance capable of combining chemically with free lead such as is found in the passages of the microchannel plate to form a second substance containing lead, and with the additional characteristic that the second substance so formed is vaporizable at such predetermined elevated temperature. Likewise any available carrier gas compatible in this system may be used in mixture with the sulfur containing gas to carry away the gases containing the volatile products of such reaction to a suitable disposal source.

FIG. 2 shows the gain stability of a microchannel plate at various stages of processing. In FIG. 2 the ordinate represents the voltage applied between the front and back of the microchannel plate and ranges between 400 and 1,000 volts. The abscissa is drawn to a logarithmic scale and represents the gain. Curve A illustrates the gain characteristic obtained after hydrogen firing of the gas. Curve B represents the gain characteristic of the microchannel plate after subsequent treatment with both hydrogen and hydrogen sulfide gases. These curves are approximately the same. Curve C shows the gain characteristic of the microchannel plate after undergoing the processing of the invention and in addition the scrubbing process. As is apparent, the scrubbing reduced the overall gain of the microchannel plate a slight amount. Curve D represents the gain characteristic on an average of a comparable microchannel plate which undergoes only the $H_2$ firing process and scrubbing and without the hydrogen sulfide treatment. As is apparent, the gain characteristic of this microchannel plate is substantially less for each value of bias voltage than that microchannel plate which has undergone the hydrogen sulfide gas treatment.

It is noted that the electrical conductivity of the passages between the front and back surfaces of the microchannel plate, an important characteristic of microchannel plates, is not adversely affected by my novel process step although, logically, if lead, an electrically conductive material, is removed from the microchannel plate passage walls as I believe occurs, one not having practiced the process would logically expect a substantial change. However as I have herein earlier hypothesized, I view the lead in the passage walls subsequent to activation as "patchy", i.e. discontinuous, hence not forming a significant complete electrical path along portions of the passage walls and hence not contributing significantly to the electrical conductivity characteristic of the passage walls in the first instance. Hence the removal of some of such lead then can be logically rationalized as having little effect on the electrical conductivity characteristic of the microchannel plate.

It is believed that the foregoing description of a preferred embodiment of my novel process is presented in sufficient detail to enable one skilled in the art to make and use the invention. However it is understood that my invention is not to be limited to those details inasmuch as many variations, modifications and improvements become apparent to those skilled in the art upon reading this specifications all of which are within the scope of my novel invention. Accordingly it is expressly understood that my invention is to be broadly construed within the full spirit and scope of the appended claims.

What I claim is:

1. The use of a gas as an agent for treating microchannel plates of the type having lead-lead oxide in a silicon dioxide matrix to obtain stabilization of the secondary emission characteristics thereof, said gas consisting of a member of the group: hydrogen sulfide, hydrogen selenide, hydrogen telluride, sulfur, and sulfur dioxide, in a process including the step of exposing said plates to said gas.

2. The use of a mixture of gases as an agent for the treatment of microchannel plates of the type fabricated of leaded glass, in which one of said gases consists substantially of hydrogen and the other of said gases consists substantially of a gas selected from the group consisting of hydrogen sulfide, hydrogen selenide, hydrogen telluride, sulfur and sulfur dioxide, in a process including the step of exposing said plates to said gas.

3. The method of stabilizing the secondary emission characteristics of an activated microchannel plate of the type comprising leaded glass matrix, comprising the step of exposing said microchannel plate to a heated gaseous mixture for a predetermined period of time, said gaseous mixture consisting of a first gas, hydrogen, and a second gas consisting of a gas selected from the group consisting of hydrogen selenide, hydrogen sulfide, hydrogen telluride, sulfur and sulfur dioxide.

4. The invention as defined in claim 3 wherein said gas is at a temperature within the range of 350° to 430° Centigrade.

5. The invention as defined in claim 4 wherein said predetermined period of time comprises approximately 12 hours and wherein the ratio of said first gas to said second gas is 2:1 by volume.

6. In the process of manufacturing microchannel plates of the type comprising a leaded glass matrix, the steps of:

producing a flow of heated hydrogen gas at a predetermined rate for incidence upon a microchannel plate for a predetermined period of time; and producing a flow of a second heated gas at a predetermined rate a predetermined interval after the commencement of said first gas flow but prior to the expiration of said predetermined period of time, said second gas consisting of a member of the group consisting of hydrogen sulfide, hydrogen telluride, hydrogen selenide, sulfur and sulfur dioxide; and co-mingling said second gas flow with said first gas flow for combined incidence on said microchannel plate until the expiration of said predetermined period of time.

7. The invention as defined in claim 6 wherein the rate of said first gas to said rate of said second gas is in the ratio of 2 to 1, and wherein said heated gases are of a temperature within the range of 350° C. to 430° C.

8. The invention as defined in claim 6 wherein said predetermined period of time comprises approximately 24 hours and wherein said predetermined interval comprises approximately 12 hours and wherein said rate of said first gas is approximately 0.1 cubic feet per minute and wherein said rate of said second gas is approximately 0.05 cubic feet per minute and wherein said heated gases are of a temperature of approximately 415° Centigrade and wherein said second gas comprises hydrogen sulfide.

9. A process for the treatment of microchannel plates comprising introducing a heated stream of a gas to a microchannel plate, said gas comprising hydrogen sulfide, and terminating said stream after a predetermined period of time.

10. In the process of manufacturing a microchannel plate from a lead glass matrix having a large number of minute passages in which the passage walls comprise lead oxide, barium, and bismuth in a silicon dioxide matrix, the additional steps comprising reducing a portion of said lead oxide to lead and directing hydrogen sulfide gas on said plate to react a remaining portion of said lead oxide with hydrogen sulfide gas to produce lead sulfide on said passage surface and water and concurrently vaporizing said lead sulfide and water.

11. In the process of manufacturing microchannel plates of the type having a lead oxide glass the steps of:

converting a portion of said lead oxide to lead;

reacting said lead with a substance in the gaseous state at an elevated temperature having an element which combines with lead and forms therewith a substance having a greater volatility than said lead oxide and which is at least partially vaporizable at said elevated temperature by exposing said substance to said lead; and removing such vaporized gases.

12. The invention as defined in claim 1 wherein the member of the group of which said second gas consists, comprises the member hydrogen sulfide.

13. The invention as defined in claim 2 wherein said other of said gases which consists substantially of said gas selected from said group is hydrogen sulfide.

14. The invention as defined in claim 3 wherein said second gas selected from said group comprises hydrogen sulfide.

* * * * *